US 9,581,929 B2

(12) United States Patent
Nagatoshi et al.

(10) Patent No.: US 9,581,929 B2
(45) Date of Patent: Feb. 28, 2017

(54) OPTICAL SCANNING APPARATUS, IMAGE FORMING APPARATUS, AND SUPPORT MEMBER FOR AN OPTICAL SCANNING APPARATUS

(71) Applicant: CANON KABUSHIKI KAISHA, Tokyo (JP)

(72) Inventors: Jun Nagatoshi, Tokyo (JP); Yoshihiko Tanaka, Mishima (JP); Hiroyuki Fukuhara, Suntou-gun (JP); Naoki Matsushita, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/815,697

(22) Filed: Jul. 31, 2015

(65) Prior Publication Data
US 2015/0338768 A1    Nov. 26, 2015

Related U.S. Application Data (63) Continuation of application No. 14/096,652, filed on Dec. 4, 2013, now Pat. No. 9,128,291.

(30) Foreign Application Priority Data

Dec. 12, 2012  (JP) ................................. 2012-271399

(51) Int. Cl.
    *G03G 15/043*   (2006.01)
    *G02B 26/12*    (2006.01)
    *G03G 21/16*    (2006.01)

(52) U.S. Cl.
    CPC ......... *G03G 15/043* (2013.01); *G02B 26/121* (2013.01); *G02B 26/129* (2013.01); *G03G 21/1666* (2013.01)

(58) Field of Classification Search
    CPC ...... G02B 26/12; G02B 26/10; G02B 26/121; G02B 26/129; G03G 15/043; G03G 21/1666
    See application file for complete search history.

(56) References Cited

U.S. PATENT DOCUMENTS 6,856,338 B2    2/2005  Takahashi et al.
6,969,846 B2    11/2005 Tanaka et al.
(Continued)

FOREIGN PATENT DOCUMENTS

JP    1-251059 A    10/1989
JP    8-271821 A    10/1996
(Continued)

*Primary Examiner* — Sarah Al Hashimi
(74) *Attorney, Agent, or Firm* — Fitzpatrick, Cella, Harper & Scinto (57) ABSTRACT

Provided is an optical scanning apparatus, including: an optical deflector having a polygon mirror reflecting a light flux emitted from a light source to carry out scanning, a drive unit rotating the polygon mirror about a rotation shaft, and a board supporting the drive unit; an optical box to which the board is fixed; two holes provided in the optical box, through which two screws fixing the board are inserted, respectively; two bearing surfaces provided on the optical box at positions around the two holes, respectively, the two bearing surfaces supporting the board; and an abutment portion provided on the optical box and abutting against a portion that is prevented from being pressed by the two screws in the board which is sandwiched between the two screws and the two bearing surfaces so as to be fixed to the optical box.

16 Claims, 10 Drawing Sheets

(56) References Cited

U.S. PATENT DOCUMENTS

| | | | |
|---|---|---|---|
| 7,342,599 B2 | 3/2008 | Maeda et al. | |
| 8,619,108 B2 | 12/2013 | Ishidate | |
| 8,723,902 B2 * | 5/2014 | Takahashi | G03G 15/28 347/138 |
| 2006/0082639 A1 * | 4/2006 | Kojima | G02B 26/121 347/224 |

FOREIGN PATENT DOCUMENTS

| | | | |
|---|---|---|---|
| JP | 2005-201941 A | | 7/2005 |
| JP | 2008-145952 A | | 6/2008 |
| JP | 2010-145928 | | 7/2010 |
| JP | 2010-237432 A | | 10/2010 |
| JP | 2011-133856 A | | 7/2011 |
| JP | 2011133856 A | * | 7/2011 |

* cited by examiner

OPTICAL SCANNING APPARATUS, IMAGE FORMING APPARATUS, AND SUPPORT MEMBER FOR AN OPTICAL SCANNING APPARATUS

This application is a continuation of U.S. application Ser. No. 14/096,652, filed Dec. 4, 2013 (pending), the contents of which are incorporated herein by reference.

BACKGROUND OF THE INVENTION

Field of the Invention

The present invention relates to an optical scanning apparatus for carrying out optical writing on a photosensitive drum or the like with use of a laser beam and a support member for an optical scanning apparatus in an image forming apparatus such as a laser beam printer (hereinafter referred to as "LBP"), a digital copying machine, and a digital facsimile machine.

Description of the Related Art

Image forming apparatus such as an LBP is configured to form an image on a recording material by forming an electrostatic latent image on a photosensitive drum in accordance with a desired image, developing the electrostatic latent image into a toner image, and by transferring the toner image onto the recording material. To form a desired electrostatic latent image on the photosensitive drum, there is used an optical scanning apparatus for irradiating and scanning the photosensitive drum with a laser beam.

Therefore, the print accuracy of such an image forming apparatus is significantly affected by the mechanical accuracy of the optical scanning apparatus. In particular, in an optical deflector for rotationally driving a rotating polygon mirror, the rotation center of the rotating polygon mirror, which serves as a reference of an optical system of the LBP, needs to be positioned with respect to an optical reference position of an optical box with high accuracy.

In view of the above, there is generally employed such positioning structure that a shaft or bearing of the optical deflector is fitted into a fitting hole provided at the optical reference of the optical box.

Conventionally, an optical deflector including a polygon mirror and a motor unit for rotating the polygon mirror is generally fixed with screws at three points surrounding the motor. In this case, a board is fixed in conformity to bearing surfaces at the respective screw fixing portions. Therefore, when the bearing surfaces are inclined, the board is distorted and the shaft of the motor unit of the optical deflector is inclined.

Further, the inclination of the rotation shaft of the optical deflector, which is called shaft inclination, may cause distortion of a spot-shape of the laser beam on the photosensitive drum, resulting in deterioration in image quality.

According to Japanese Patent Application Laid-Open No. 2005-201941, the optical deflector is fixed to the optical box with use of a screw and a spring, and the screw is tightened and loosened after the optical deflector is fixed, to thereby adjust the push-in amount and control the shaft inclination.

In the structure disclosed in Japanese Patent Application Laid-Open No. 2005-201941, however, the assembly process becomes complicated for the sake of shaft inclination control, thus leading to a problem in that the number of steps is increased.

SUMMARY OF THE INVENTION

The present invention provides a structure for suppressing shaft inclination of an optical deflector even without a shaft inclination control function.

The present invention provides an optical scanning apparatus, including: an optical scanning apparatus, including: an optical deflector having a polygon mirror reflecting a light flux emitted from a light source to carry out scanning, a drive unit rotating the polygon mirror about a rotation shaft, and a board supporting the drive unit; an optical box to which the board is fixed; two holes provided in the optical box, through which two screws fixing the board are inserted, respectively; two bearing surfaces provided on the optical box at positions around the two holes, respectively, the two bearing surfaces supporting the board; and an abutment portion provided on the optical box and abutting against a portion that is prevented from being pressed by the two screws in the board which is sandwiched between the two screws and the two bearing surfaces so as to be fixed to the optical box.

Moreover, the present invention provides an image forming apparatus, including: a photosensitive member; an optical scanning apparatus irradiating and scanning the photosensitive member with light, the optical scanning apparatus having an optical deflector and an optical box; the optical deflector including a polygon mirror reflecting a light flux emitted from a light source to carry out scanning, a drive unit rotating the polygon mirror about a rotation shaft, and a board supporting the drive unit; the optical box to which the board is fixed; a developing device forming a toner image by causing toner to adhere onto the photosensitive member that is irradiated with the light by the optical scanning apparatus; a transfer device transferring the toner image, which is formed by the developing device, onto a recording material; two holes provided in the optical box, through which two screws fixing the board are inserted, respectively; two bearing surfaces provided on the optical box at positions around the two holes, respectively, the two bearing surfaces supporting the board; and an abutment portion provided on the optical box, and abutting against a portion that is prevented from being pressed by the two screws in the board which is sandwiched between the two screws and the two bearing surfaces so as to be fixed to the optical box.

Moreover, the present invention provides a support member for an optical scanning apparatus, which is configured to support an optical deflector having a polygon mirror reflecting a light flux emitted from a light source to carry out scanning, a drive unit rotating the polygon mirror about a rotation shaft, and a board supporting the drive unit, the support member including: two holes through which two screws fixing the board are inserted, respectively; two bearing surfaces provided at positions around the two holes, respectively, the two bearing surfaces supporting the board; and two abutment portions abuttable against portions that are prevented from being pressed by the two screws in the board, one of the two abutment portions abutting against the board when the board of the optical deflector is sandwiched between the two screws and the two bearing surfaces so as to be fixed to an optical box.

Further features of the present invention will become apparent from the following description of exemplary embodiments with reference to the attached drawings.

DESCRIPTION OF THE EMBODIMENTS

Now, an embodiment of the present invention is described in detail with reference to the attached drawings.

(Overall Structure of Image Forming Apparatus)

Figure 12:
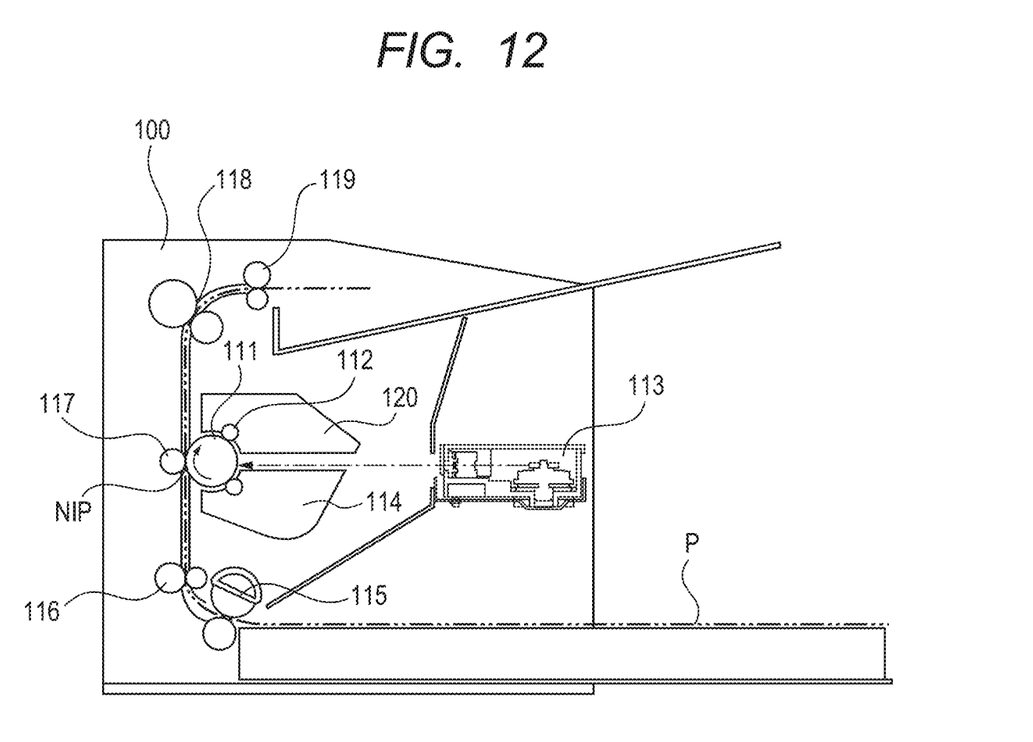
FIG. 12 illustrates the structure of an image forming apparatus according to the embodiment of the present invention.

FIG. 12 illustrates the overall structure of an image forming apparatus according to the embodiment of the present invention. The image forming apparatus is a printer that employs an electrophotographic process.

A printer 100 is configured to receive image information from an external host computer or the like (not shown), and to record an image in accordance with the received image information by forming the image onto a sheet-like recording material P.

When the printer 100 receives a print signal, the printer 100 starts rotational drive of a photosensitive drum 111 (object to be irradiated, or image bearing member) serving as a photosensitive member for bearing a toner image. The photosensitive drum 111 is rotationally driven in a clockwise direction at a predetermined peripheral speed. A charging roller 112 having a predetermined bias applied thereto charges the surface of the photosensitive drum 111 at a predetermined potential.

Subsequently, in accordance with the image information received from the host computer or the like (not shown), an optical scanning apparatus 113 scans and exposes with light the charged portion on the surface of the photosensitive drum 111. In the region exposed with light, an electrostatic latent image is formed on the surface of the photosensitive drum 111 in accordance with the image information. A developing device 114 (developing unit) causes toner to adhere onto the surface of the photosensitive drum 111, and thus the electrostatic latent image is visualized as (developed into) a toner image.

A driven feed roller 115 separates and feeds a single recording material P from a feed cassette at a predetermined timing. The recording material P fed from the feed cassette is fed by a registration roller pair 116 at a predetermined control timing to a transfer nip portion NIP formed between the photosensitive drum 111 and a transfer roller 117 (transfer unit). In the process in which the recording material P is nipped and conveyed through the transfer nip portion NIP, the toner image on the photosensitive drum 111 is transferred onto the recording material P in a sequential manner.

After the toner image is transferred, a fixing device 118 heats and fixes the toner image onto the recording material P. Then, the recording material P passes through a delivery roller pair 119, and is delivered outside the printer main body.

A cleaning device 120 removes untransferred toner remaining on the photosensitive drum 111, and the series of image forming processes is completed.

(Structure of Optical Scanning Apparatus)

Figure 1:
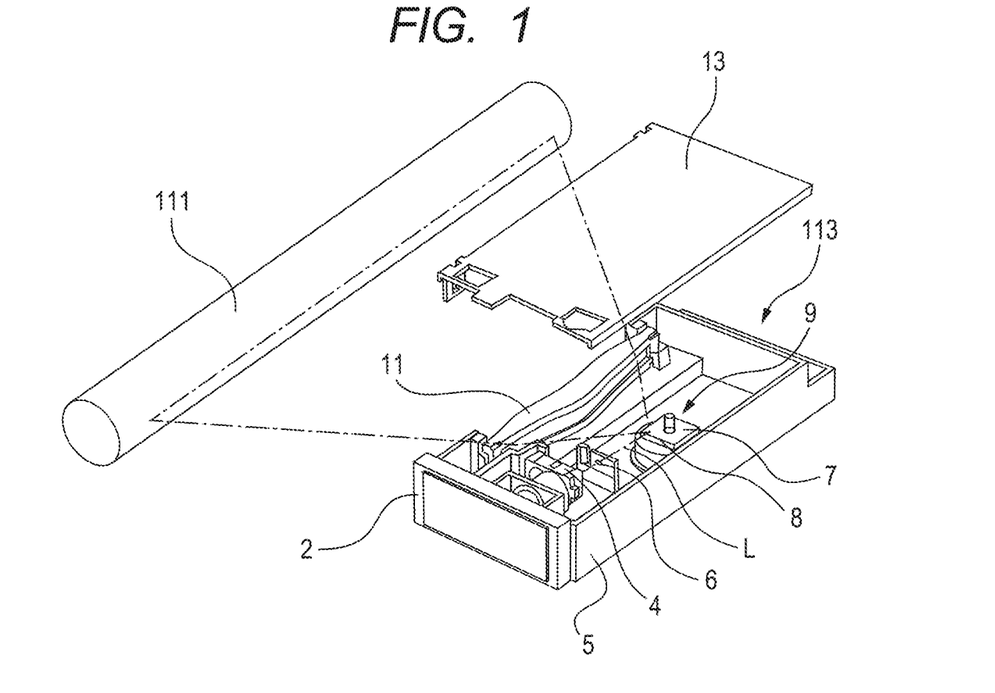
FIG. 1 is a perspective view illustrating the structure of an optical scanning apparatus according to an embodiment of the present invention.

FIG. 1 is a perspective view illustrating the structure of the optical scanning apparatus 113. In front of a semiconductor laser unit 2 (light source), a cylindrical lens 4, an optical stop 6, and an optical deflector 9 are arranged in sequence. The optical deflector 9 is configured to rotationally drive a rotating polygon mirror 7. In a direction of light reflection of the rotating polygon mirror 7, an fθ lens 11 and the photosensitive drum 111 are arranged in sequence.

An optical box 5 serves as a casing for receiving those optical members, and also serves as a support member for supporting the optical deflector 9 as described later. The optical members are received in a space enclosed by the optical box 5, a lid 13, and the like.

A laser beam L (light flux) emitted from the semiconductor laser unit 2 forms a linear image on a reflection surface 8 of the rotating polygon mirror 7 through the cylindrical lens 4. The laser beam L is deflected through rotation of the rotating polygon mirror 7 by the optical deflector 9, and forms an image on the photosensitive drum 111 through the fθ lens 11 to irradiate and scan the photosensitive drum 111.

Through the rotation of the rotating polygon mirror 7, main scanning of the photosensitive drum 111 with the laser beam L is carried out, and through the rotational drive of the photosensitive drum 111 about an axis of its cylinder, sub-scanning of the photosensitive drum 111 with the laser beam L is carried out. In this manner, the electrostatic latent image is formed on the surface of the photosensitive drum 111.

(Structure of Optical Deflector)

Figure 2:
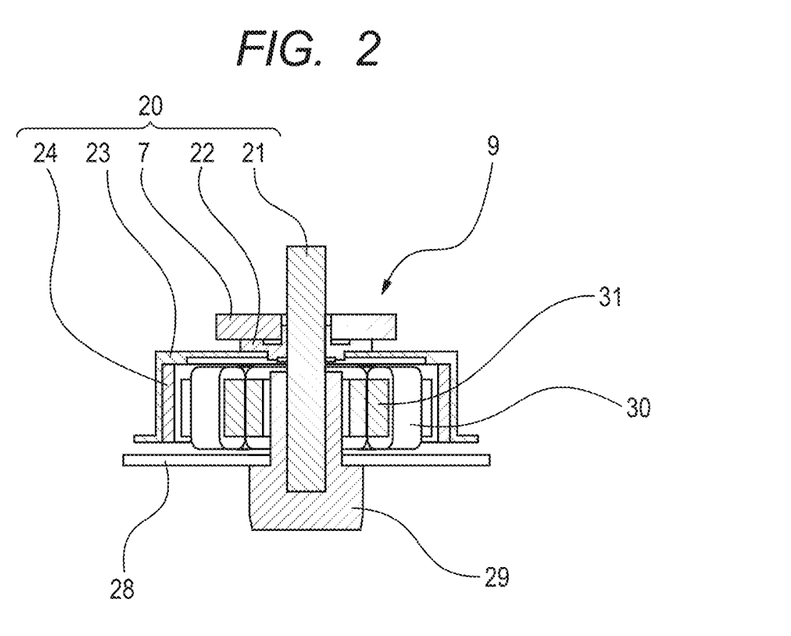
FIG. 2 is a sectional view illustrating an optical deflector of the optical scanning apparatus in FIG. 1.

FIG. 2 is a sectional view illustrating the structure of the optical deflector 9 for rotationally driving the rotating polygon mirror 7.

A rotor unit 20 (rotational drive unit) of the optical deflector 9 includes a rotation shaft 21, a flange member 22, the rotating polygon mirror 7, a rotor yoke 23, and a rotor magnet 24. The rotation shaft 21 is integrally coupled to the rotor yoke 23 through an intermediation of the flange member 22, and the rotor magnet 24 is integrally coupled to the rotor yoke 23. The rotating polygon mirror 7 is fixed to the flange member 22. That is, the rotation shaft 21, the flange member 22, the rotor yoke 23, the rotor magnet 24, and the rotating polygon mirror 7 are integrally coupled to each other, and those members are integrally rotated when the rotation shaft 21 is rotated.

A board 28 and a sleeve 29 are integrally coupled to each other, and the sleeve 29 supports the rotor unit 20 in a rotatable manner through an intermediation of the rotation shaft 21.

A stator core 31 including a stator coil 30 is also fixed to the board 28 integrally. The board 28 is a circuit board made of iron, and electronic components such as an integrated circuit for driving the rotating polygon mirror 7 are mounted on the board 28. The board 28 is not limited to the circuit board made of iron, and may be a printed board such as a phenolic-paper board and an epoxy-glass board combined with a metal plate.

In the optical deflector 9, a drive circuit (not shown) sequentially switches currents flowing through the stator coil 30, to thereby rotationally drive the rotor unit 20. That is, through the switching of currents flowing through the stator coil 30, a magnetic field generated by the stator coil 30 and the stator core 31 is changed. As a result, a rotational force is applied to the rotor magnet 24, and thus the rotor unit 20 is rotated.

(Assembly of Optical Deflector to Optical Box)

Figure 3:
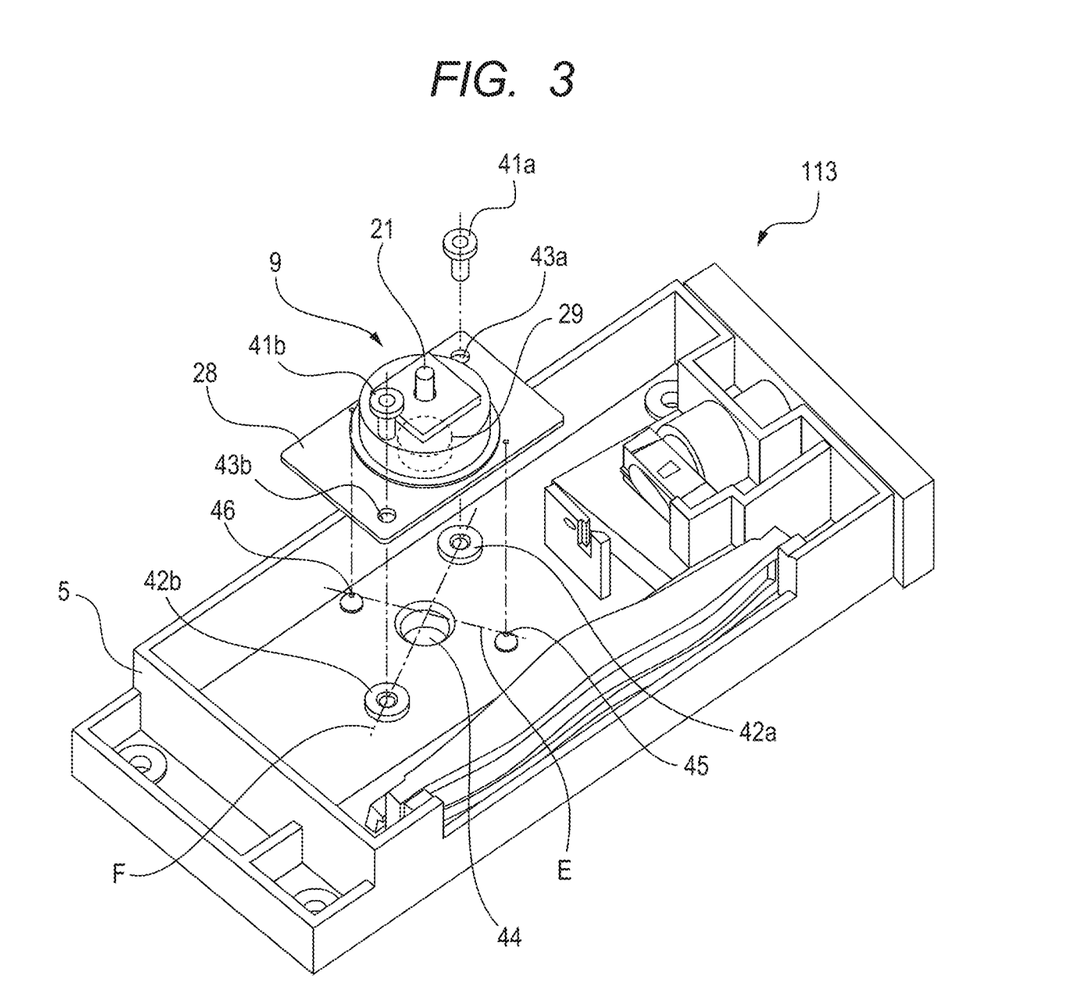
FIG. 3 illustrates assembly of the optical deflector according to the embodiment of the present invention.

FIG. 3 is a perspective view of the optical scanning apparatus 113 according to this embodiment, for illustrating a state in which the optical deflector 9 is assembled to the optical box 5.

Screw holes 43a and 43b are provided in the board 28 of the optical deflector 9 at positions in the vicinity of the rotation shaft 21. Bearing surfaces 42a and 42b (bearing surfaces for supporting the board 28) are provided on the optical box 5 at positions around holes through which screws 41a and 41b are inserted to fix the board 28, respectively. Abutment portions 45 and 46 are provided on the optical box 5 at positions other than the positions of the bearing surfaces 42a and 42b. As illustrated in FIG. 3, the bearing surfaces 42a and 42b and the abutment portions 45 and 46 are provided so as to protrude from the bottom surface of the optical box 5 toward the board 28 (toward the board). A straight line F connecting the bearing surfaces 42a and 42b and a line segment E passing through the abutment portions 45 and 46 are substantially orthogonal to each other at the center of a fitting hole 44. That is, the abutment portion 45 and the abutment portion 46 are arranged opposite to each other across the straight line F. As is also understood from FIG. 3, the center of the fitting hole 44 is arranged on a line segment corresponding to a section between the bearing surfaces 42a and 42b in the straight line F connecting the bearing surfaces 42a and 42b.

The position of the optical deflector 9 is determined by fitting the sleeve 29 into the fitting hole 44 that is provided in the optical box 5. The optical deflector 9 is fixed in the following manner. That is, portions around the screw holes 43a and 43b of the board 28 are pressed by the screws 41a and 41b toward the bearing surfaces 42a and 42b of the optical box 5, and the portions around the screw holes 43a and 43b of the board 28 are sandwiched between the screws 41a and 41b and the bearing surfaces 42a and 42b, respectively, so that the board 28 is fastened. When the optical deflector 9 is fastened with the screws 41a and 41b, the board 28 may be deformed due to inclination of the bearing surfaces 42a and 42b. That is, when the board 28 is fastened to the bearing surfaces 42a and 42b with the screws 41a and 41b, respectively, the portions around the screw holes 43a and 43b of the board 28 are pressed by the screws 41a and 41b. Thus, the portions around the screw holes 43a and 43b of the board 28 are brought into contact with at least a plurality of points on the screws 41a and 41b and the bearing surfaces 42a and 42b, or are substantially brought into surface contact with the screws 41a and 41b and the bearing surfaces 42a and 42b. As a result, the board 28 is deformed so as to substantially follow a tilt direction (inclination) of the bearing surfaces 42a and 42b.

When the optical deflector 9 is fastened with the screws 41a and 41b, the abutment portions 45 and 46 abut against and support portions of the board 28 that are not pressed by the screws 41a and 41b. Thus, the board 28 is pushed back, to thereby suppress the deformation of the board 28 that may occur due to the inclination of the bearing surfaces 42a and 42b.

That is, the abutment portions 45 and 46 are abuttable against the bottom surface of the board 28 of the optical deflector 9, and when the optical deflector 9 is fixed to the optical box 5 with the rotation shaft 21 inclined with respect to the proper mounting direction, the abutment portions 45 and 46 abut against the optical deflector 9 to suppress the inclination.

The abutment portions 45 and 46 are abuttable against the board 28 of the optical deflector 9, but unlike the bearing surfaces 42a and 42b, the board 28 is not fixed with screws or the like at the abutment portions 45 and 46. That is, the abutment portions 45 and 46 abut against the portions of the board 28 that are not pressed by the screws. Therefore, even when the board 28 abuts against the abutment portions 45 and 46, the board 28 is not twisted as compared to the case where the board 28 is pressed by the screws at the abutment portions 45 and 46. However, when the board 28 abuts against the abutment portions 45 and 46, the board 28 is substantially brought into contact with the abutment portions 45 and 46 only at a single point. It is herein assumed that the "abutment portion" is a portion without the screw fastening or the like between the abutment portion and the object (board 28) subjected to abutment. As long as the board 28 is substantially brought into contact with the abutment portions 45 and 46 only at a single point, there may be provided such an elastic member that the portions of the board 28 that abut against the abutment portions 45 and 46 are pressed toward the abutment portions 45 and 46 under a small pressure.

Next, a state in which shaft inclination of the optical deflector 9 occurs when the bearing surfaces of the optical box 5 are inclined is described.

Figure 4:
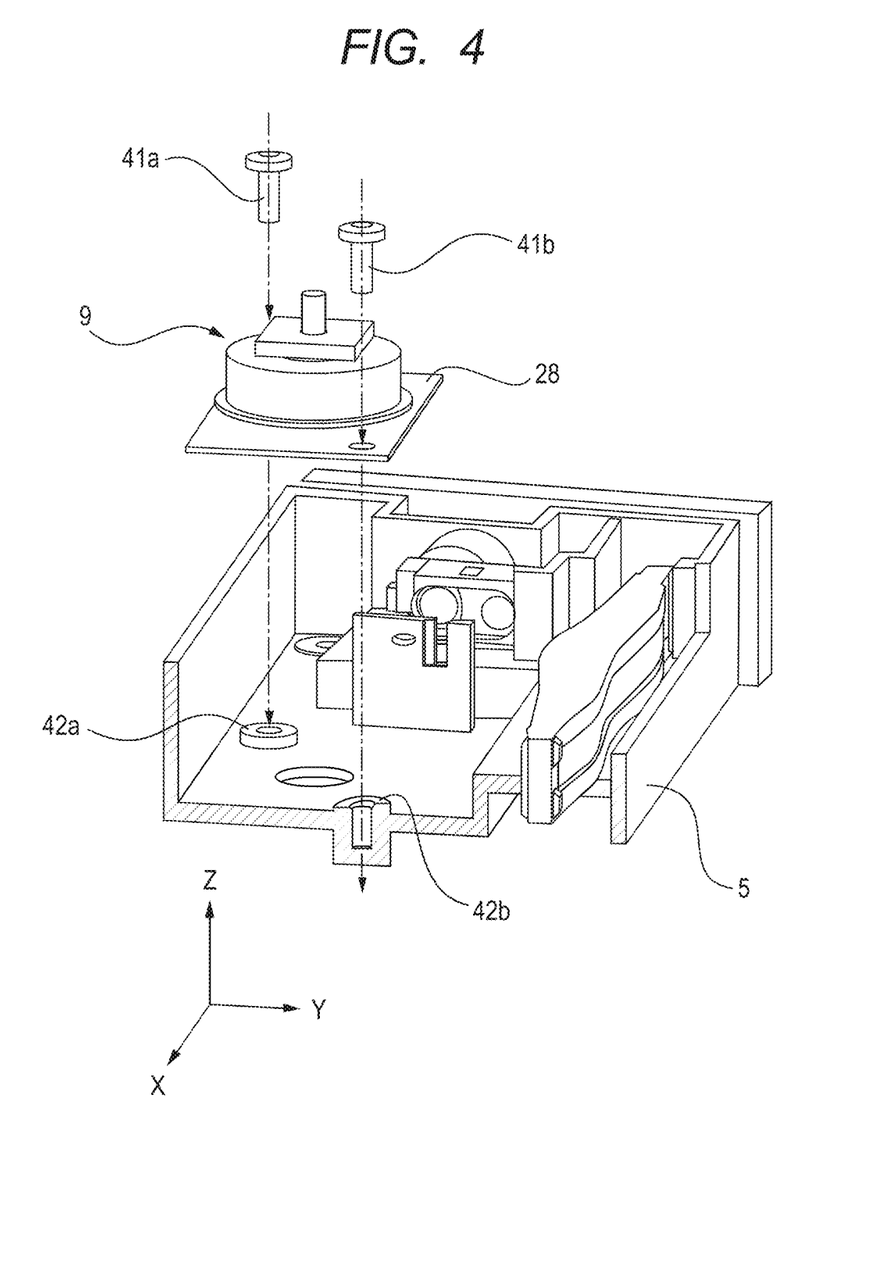
FIG. 4 is a perspective view illustrating a state in which the optical deflector is assembled to an optical box in a case where abutment portions are not provided.

FIG. 4 is a perspective view illustrating a state in which the optical deflector 9 is assembled to an optical box 5. FIG. 4 illustrates a cross section cut along a plane passing through the center of the bearing surface 42b of the optical box 5. Referring to FIG. 4, description is given by way of the optical box 5 that does not include the abutment portions 45 and 46 provided on the optical box 5 illustrated in FIG. 3, but for the sake of easy understanding of the description, the other reference symbols are the same as those in FIG. 3.

It is originally desired that the bearing surfaces 42a and 42b of the optical box 5 be formed horizontally. However, due to variation of the molding process or the like, the bearing surfaces 42a and 42b may be inclined at a level of several tens of micrometers. FIG. 4 illustrates a state assuming that the bearing surface 42b is rotated about the X axis in the coordinates illustrated in FIG. 4, that is, a state in which the bearing surface 42b is inclined to descend along the −Y direction (for the sake of description, the inclination of the bearing surface 42b is exaggerated).

Next, a case where the optical deflector 9 is assembled to the optical box 5 having such a bearing surface 42b is described.

Figure 5:
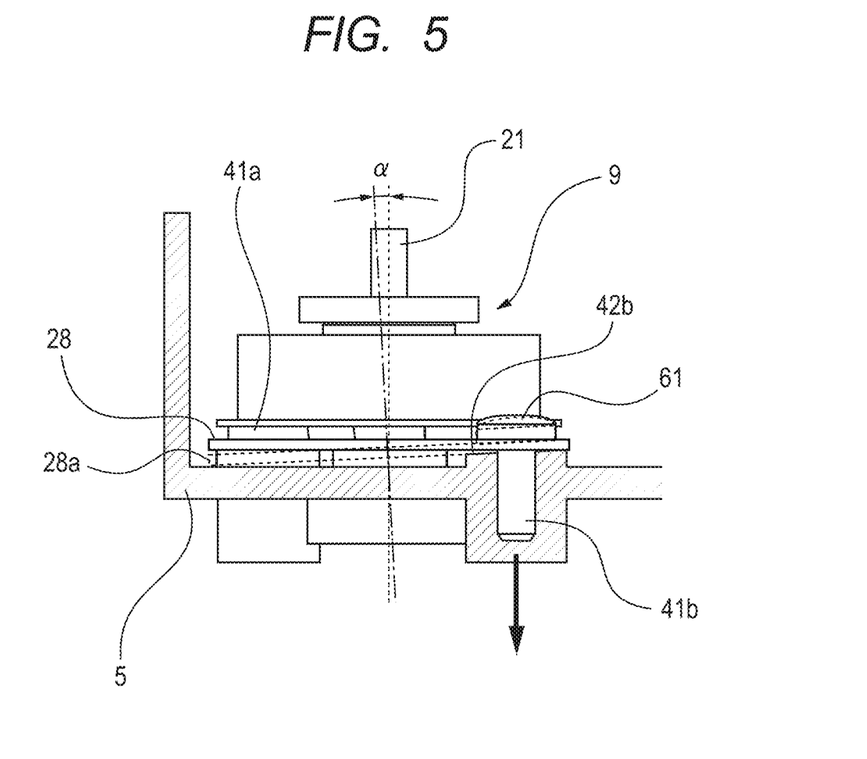
FIG. 5 is a sectional view illustrating a state in which the optical deflector is fastened to the optical box with screws in the case where the abutment portions are not provided.

FIG. 5 is a sectional view illustrating the case where the optical deflector 9 is fastened to the optical box 5 with the screw 41a and the screw 41b. When the screw 41b is tightened to the inclined bearing surface 42b, a header 61 of the screw 41b and the inclined bearing surface 42b sandwich the board 28 therebetween, and the board 28 is deformed in conformity to the inclination of the bearing surface 42b as represented by a board 28a that is indicated by the broken line. As a result, the rotation shaft 21 is inclined at an angle α.

Figure 6A:
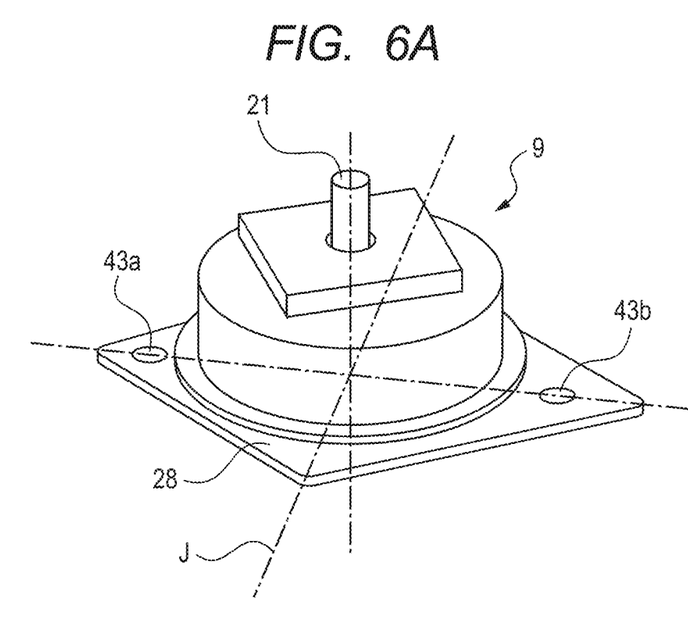
FIG. 6A is a perspective view illustrating a state in which the optical deflector is fastened to the optical box.
Figure 6B:
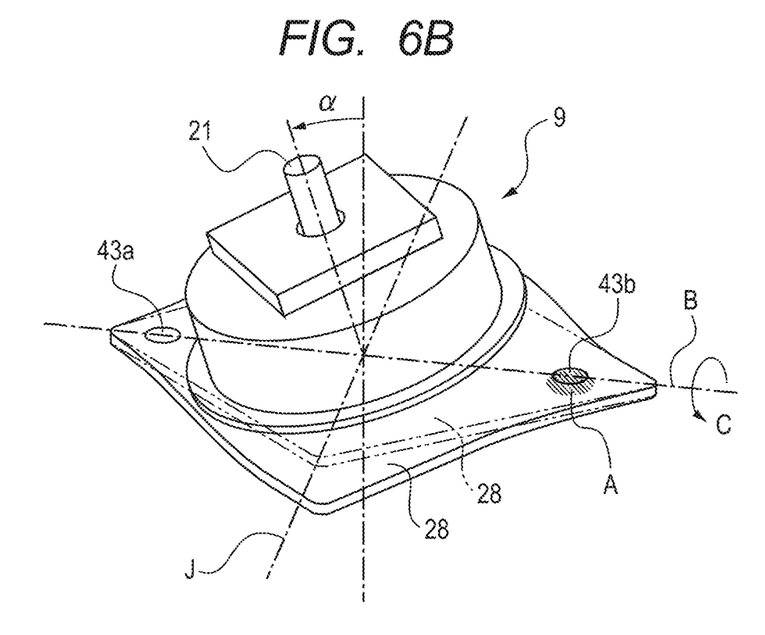
FIG. 6B is a perspective view illustrating a state of deformation occurring when the optical deflector is fastened to the optical box in the case where the abutment portions are not provided.

FIGS. 6A and 6B are perspective views of the optical deflector 9, for illustrating details of the deformation of the board 28 in the case described above. FIG. 6A illustrates the board 28 mounted in a non-deformed state, and FIG. 6B exaggerates the board 28 mounted in a deformed state for the sake of description. The two-dot chain line in FIG. 6B indicates the board 28 in the non-deformed state, and the solid line in FIG. 6B indicates the board 28 in the deformed state. As described above with reference to FIG. 5, the header 61 of the screw 41b and the inclined bearing surface 42b sandwich the board 28 therebetween, and hence the header 61 applies a force to a hatched portion A in the vicinity of the screw hole 43b. This force acts as twisting moment applied in the arrow C direction about an axis passing through the center of the screw hole 43a and the center of the screw hole 43b (virtual axis B). Due to the twist, the board 28 is deformed and the rotation shaft 21 is inclined at the angle α.

The above description is directed to the state in which the bearing surface 42b is rotated about the X axis, that is, the case where the bearing surface 42b is inclined to descend along the −Y direction. Alternatively, the bearing surface 42b may be inclined in another direction, or the bearing surface 42a and the bearing surface 42b may be inclined in different directions.

Figure 7:
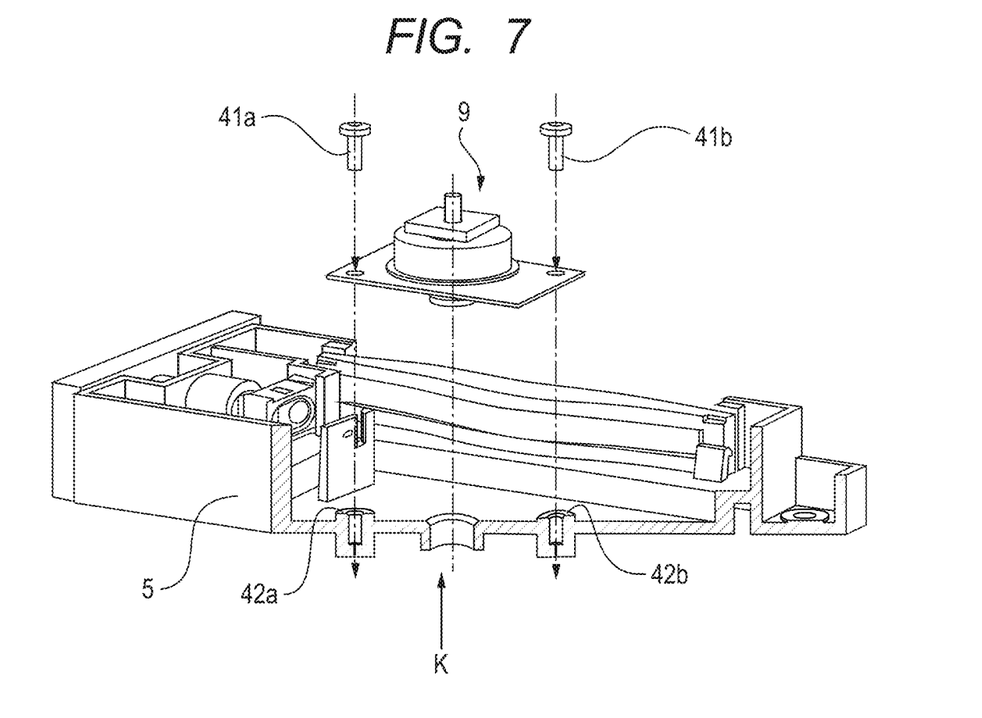
FIG. 7 is a perspective view illustrating a state in which the optical deflector is fastened with screws to an optical box having one bearing surface inclined toward the other bearing surface in the case where the abutment portions are not provided.

FIG. 7 is a perspective view illustrating a state in which the optical deflector 9 is fastened with the screw 41a and the screw 41b to the optical box 5 having the bearing surface 42b inclined to descend toward the bearing surface 42a.

For the sake of easy understanding, the optical box 5 is cut along a plane passing through the center of the bearing surface 42a and the center of the bearing surface 42b.

Figure 8:
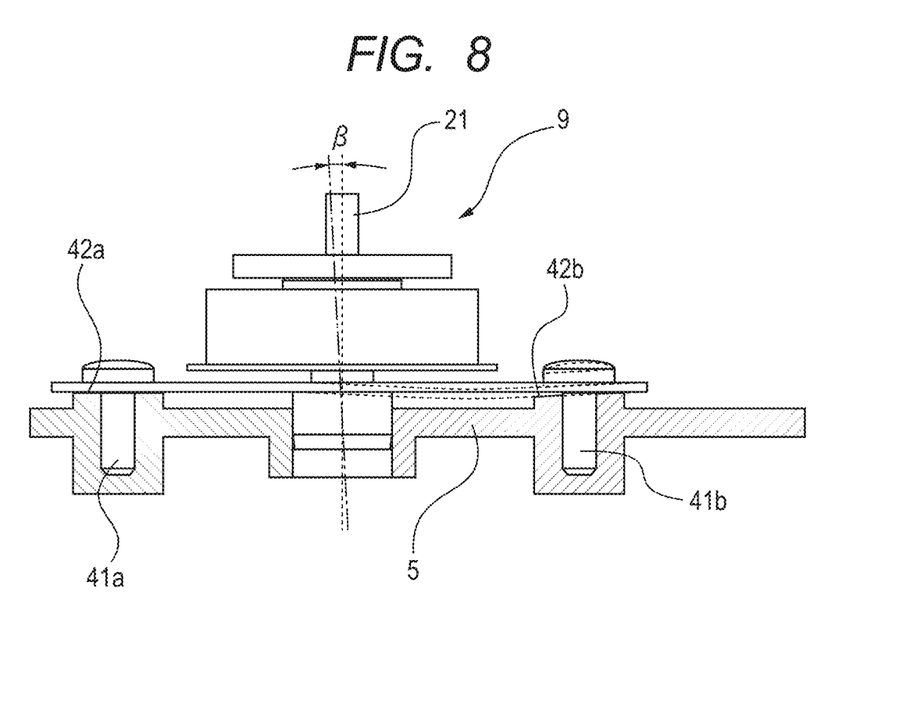
FIG. 8 is a side view illustrating deformation of a board in the case of FIG. 7.

FIG. 8 is a side view illustrating a state in which the optical deflector 9 is fastened to the optical box 5 with the screw 41a and the screw 41b as seen in the arrow K direction in FIG. 7.

The inclined bearing surface 42b and the screw 41b sandwich the board 28 therebetween, and hence the board 28 is deformed. In this case, however, the bearing surface 42a is located in a direction in which the board 28 is to be deformed, and hence the deformation of the board 28 is suppressed. Thus, an inclination β of the rotation shaft 21 is trivial as compared to the inclination α in FIG. 5.

As described above with reference to FIGS. 4 to 8, when portions in the vicinity of the rotation shaft 21 of the optical deflector 9 are fixed with the screws at two points, the board 28 is twisted more significantly about the virtual axis B (see FIG. 6B) passing through the two screw fixing points, whereas the board 28 is twisted less significantly about an virtual axis J (see FIG. 6B) orthogonal to the virtual axis B. Thus, the two bearing surfaces 42a and 42b of the optical box 5 may be inclined in any direction, but the board 28 is twisted more significantly about the virtual axis B passing through the two screw fixing points.

Figure 9:
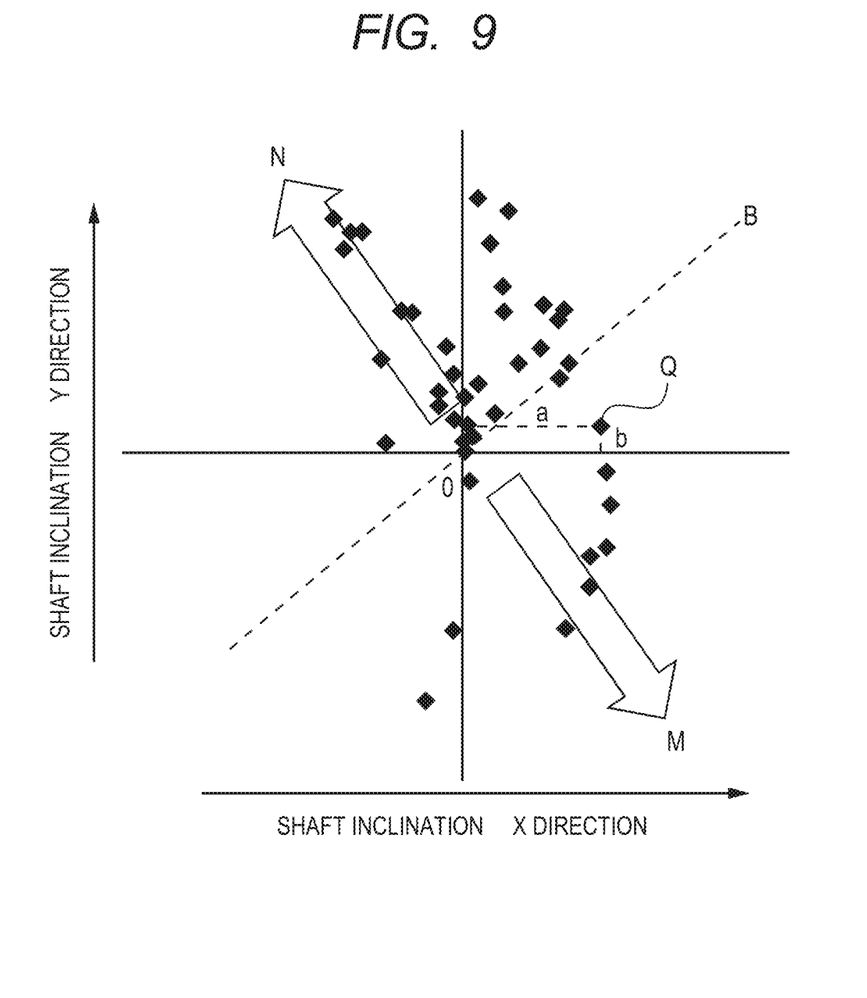
FIG. 9 is a scatter plot of angles of shaft inclination of a rotation shaft in the case where the abutment portions are not provided.

FIG. 9 is a scatter plot of angles of the shaft inclination of the rotation shaft 21 in top view of the rotation shaft 21 when the optical deflector 9 is fixed to the optical box with the screws several times in the case where the abutment portions 45 and 46 are not provided.

The X and Y coordinates of the scatter plot are identical with the coordinates illustrated in FIG. 4. In FIG. 9, the center O indicates that the shaft inclination is not present. Further, the point Q indicates that the upper end portion of the rotation shaft 21 is moved due to the shaft inclination by a distance "a" in the X direction and a distance "b" in the Y direction.

As described above with reference to FIGS. 6A and 6B, it is understood that the inclination of the rotation shaft 21 is distributed widely in the arrow M direction and the arrow N direction due to the twist about the virtual axis B passing through the two screw fixing points.

Next, a state in which the shaft inclination is suppressed by providing the abutment portions 45 and 46 of this embodiment is described.

Figure 10:
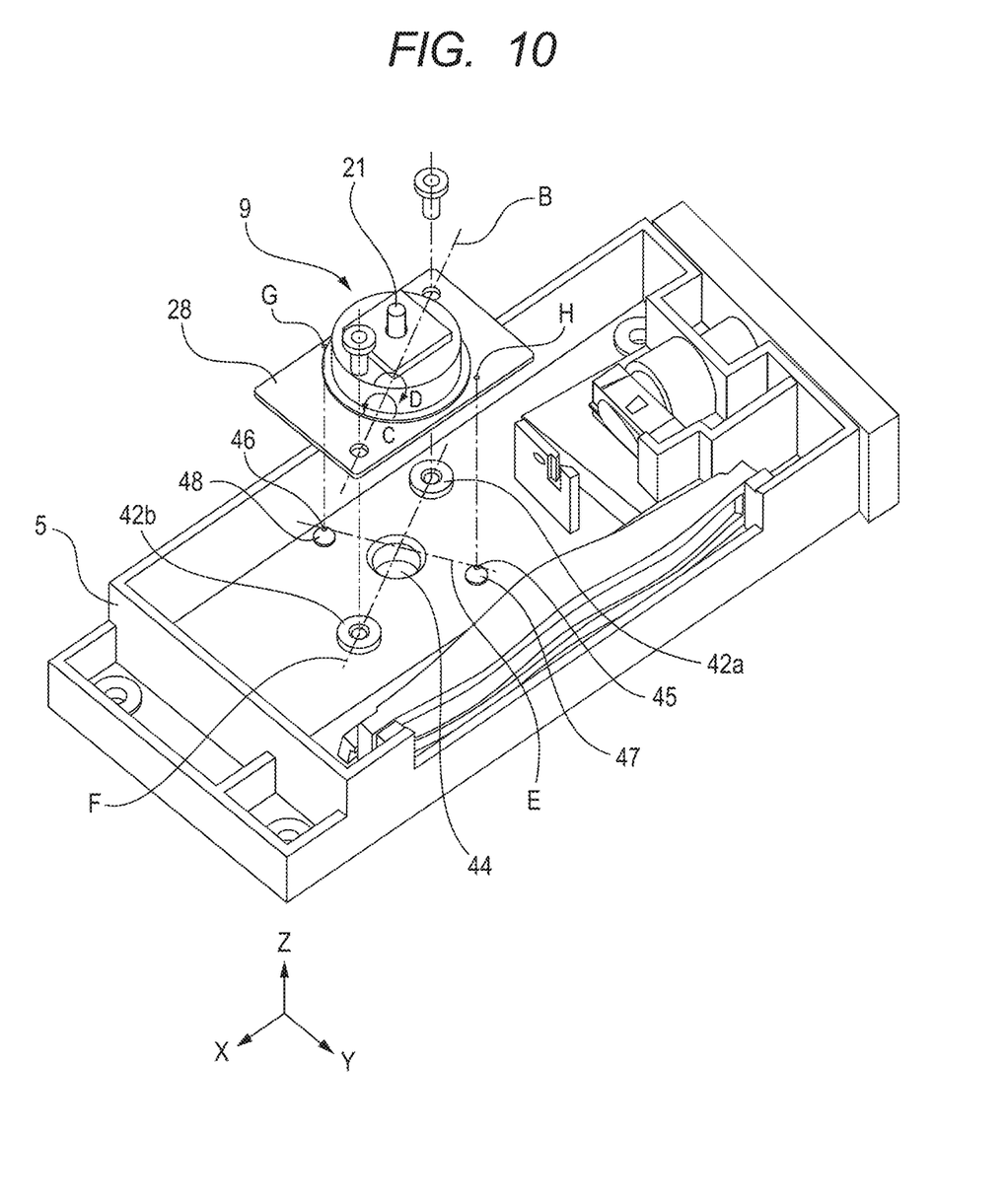
FIG. 10 is a perspective view of the optical scanning apparatus, for illustrating a state in which the abutment portions suppress the deformation of the board according to the embodiment of the present invention.

FIG. 10 is a perspective view of the optical scanning apparatus 113, for illustrating the state in which the abutment portions 45 and 46 of this embodiment suppress the deformation of the board 28.

The optical box 5 of this embodiment includes the abutment portions 45 and 46 around the fitting hole 44. In a case where the bearing surface 42a or the bearing surface 42b is inclined about an axis F passing through the two screw fixing points as described above, when the optical deflector 9 is fixed with the screws, the board 28 is twisted about the virtual axis B. In this embodiment, however, in a case where the board 28 is twisted in the arrow C direction, the abutment portion 46 pushes back a region G of the board 28 (abutment region between the abutment portion 46 and the board 28), and in a case where the board 28 is twisted in the arrow D direction, the abutment portion 45 pushes back a region H of the board 28 (abutment region between the abutment portion 45 and the board 28). Thus, the twist of the board 28 is suppressed. Through the suppression of the twist of the board 28, it is possible to suppress the inclination of the rotation shaft of the optical deflector 9 that occurs due to the inclination of the bearing surface 42a or 42b.

As the accuracy of the height dimensions of the abutment portions 45 and 46 (in the Z direction) is higher, the variation of the shaft inclination is further suppressed. Therefore, it is preferred that the area of the contact portion between the abutment portions 45 and 46 and the board 28 is as small as possible. That is, the area of contact when the abutment portions 45 and 46 abut against the optical deflector 9 is set smaller than the area of contact between the two bearing surfaces 42a and 42b and the optical deflector 9 when the optical deflector 9 is fixed with the screws to the two bearing surfaces 42a and 42b of the optical box 5. It is ideal that each of the abutment portions 45 and 46 be brought into contact (point contact) with the optical deflector 9 substantially at a single point. As the area of contact of the abutment portions 45 and 46 is smaller, the inclination of the abutment surfaces due to the variation of the molding process or the like becomes smaller like the bearing surfaces 42a and 42b, with the result that the variation of the height dimensions is smaller as well. As the variation of the heights of the abutment portions is smaller, the variation of the angle of pushing back the board (about the virtual axis B) is smaller as well, with the result that the variation of the shaft inclination is smaller as well.

In this embodiment, as illustrated in FIG. 10, tapered boss portions 47 and 48 are provided on the bottom surface of the optical box 5, and the abutment portions 45 and 46 are provided at the center portions of those boss portions 47 and 48, respectively. That is, the boss portions 47 and 48 are tapered so that the sectional areas are gradually reduced as the distance from the portion in contact with the optical box 5 is increased.

When the boss portions 47 and 48 supporting the abutment portions 45 and 46, respectively, are significantly shrunk due to a force applied so as to push back the twisted board 28, the heights of the abutment portions 45 and 46 vary, which also causes the variation of the shaft inclination. Therefore, it is preferred that the sectional areas of the boss portions 47 and 48 (planes perpendicular to the Z axis) be larger so as to suppress the shrinkage of the boss portions 47 and 48. To satisfy the above-mentioned two conditions, it is appropriate that the boss portions 47 and 48 be tapered so that the sectional areas are increased toward the bottom.

The heights of the abutment portions 45 and 46 (degrees of protrusion from the bottom surface of the optical box 5 toward the board 28 in a direction along the rotation shaft 21) are set equal to each other. When the board 28 is mounted in the proper mounting direction without being twisted, that is, without the shaft inclination of the rotation shaft 21, the heights of the abutment portions 45 and 46 may be set so that the abutment portions 45 and 46 do not abut against the board. As long as the abutment portions 45 and 46 do not press the board, the heights of the abutment portions 45 and 46 may be set so that the abutment portions 45 and 46 abut against the board. Thus, when the board 28 is mounted under a state in which the rotation shaft 21 is not inclined, the abutment portions 45 and 46 do not press the board.

When the board 28 is fixed with the screws in the case where, for example, the bearing surface 42a or 42b is inclined, the board 28 is twisted in conformity to the bearing surface 42a or 42b. However, when the board 28 is twisted as described above, one of the abutment portions 45 and 46 that is located on the twist side abuts against the board 28 to suppress the shaft inclination. At this time, the abutment portion abutting against the board 28 is pushed by the board 28 to shrink in some degree. Therefore, a gap is generated between the opposite abutment portion and the board 28, and the board 28 is supported on the optical box 5 at three points, that is, one of the abutment portions 45 and 46, the bearing surface 42a, and the bearing surface 42b. Further, the portion of the board 28 that abuts against the abutment portion is not directly pressed by the screw, and hence the board is not easily distorted.

Figure 11:
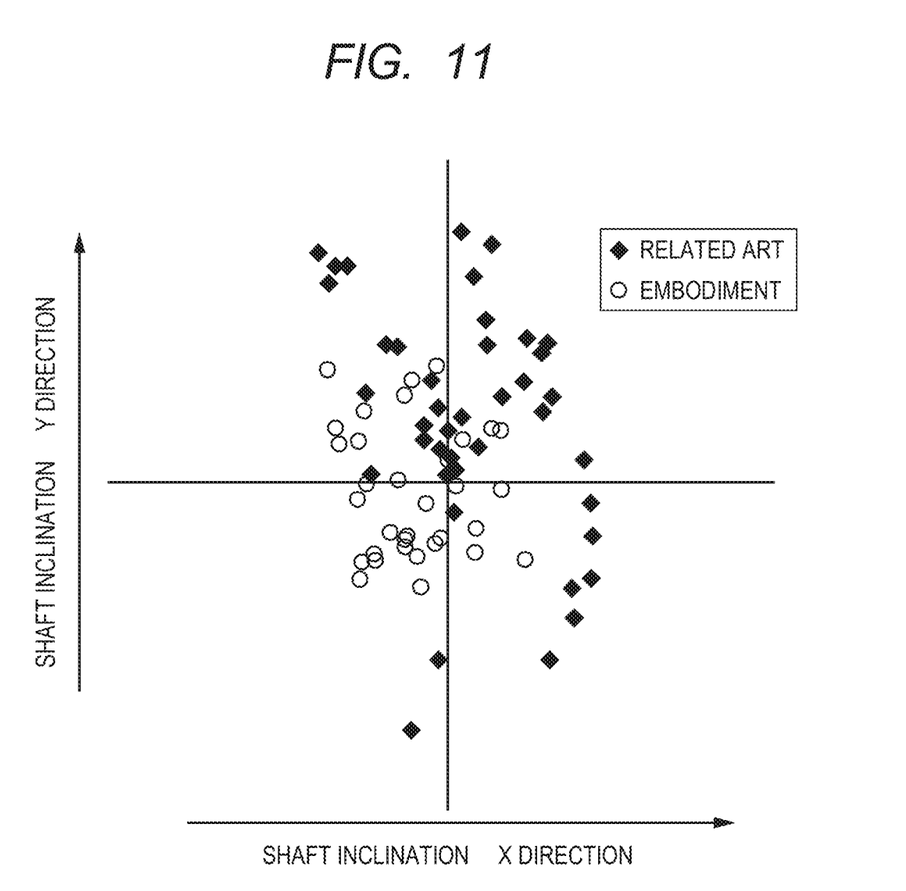
FIG. 11 is a scatter plot of angles of shaft inclination of a rotation shaft according to the embodiment of the present invention.

FIG. 11 is a scatter plot of angles of the shaft inclination of the rotation shaft 21 in top view of the rotation shaft 21 when the optical deflector 9 is fixed to the optical box 5 of this embodiment with the screws several times in a manner similar to that in FIG. 9. In FIG. 11, the black marks indicate angles of the shaft inclination according to the related art as illustrated in FIG. 9, and the white marks indicate angles of the shaft inclination according to this embodiment. As illustrated in FIG. 11, it is understood that, in this embodiment, the number of significant shaft inclinations is reduced and thus the shaft inclination is suppressed as compared to the related art.

When the optical deflector 9 is driven, vibrations occur due to imbalance of the rotor unit 20. The vibrations are transferred to the board 28, and hence the vibrating board 28 may be brought into contact with one of the abutment portions 45 and 46 that is not originally in contact with the board 28, with the result that unusual noise is generated. Therefore, the abutment portions 46 and 45 may be set slightly higher than the bearing surfaces 42a and 42b, to thereby bring both the abutment portions 45 and 46 into constant abutment against the board 28. That is, the abutment portions 46 and 45 protrude from the bottom surface of the optical box 5 toward the board 28 in the direction along the rotation shaft 21 higher than the bearing surfaces 42a and 42b. Also in this case, the above-mentioned effect of suppressing the twist of the board 28 is maintained.

As described above, according to this embodiment, the abutment portions 45 and 46 are provided, and hence, even in a case where the bearing surface of the optical box for fixing the optical deflector 9 is inclined, the significant twist of the board 28 of the optical deflector 9 can be suppressed. That is, when the optical deflector is fixed to the optical box under a state in which the rotation shaft is inclined with respect to the proper mounting direction, the abutment portions abut against the optical deflector so that the inclination can be suppressed. Thus, it is possible to suppress the distortion of the board of the optical deflector when the optical deflector is assembled to the optical box, and to thereby suppress the shaft inclination. Therefore, it is possible to stably manufacture an optical scanning apparatus 113 that is suppressed in the shaft inclination of the optical deflector 9, and to thereby prevent an image defect that may be caused by the shaft inclination in the image forming apparatus.

According to the present invention, the accuracy of the shaft inclination in a state in which the optical deflector is assembled to the optical box can be enhanced even without the shaft inclination control function. That is, the distortion the spot-shape of the laser beam on the photosensitive drum and the bending of the scanning line are suppressed, and thus the image defect can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-271399, filed Dec. 12, 2012, which is hereby incorporated by reference herein in its entirety.

What is claimed is:

1. An optical scanning apparatus, comprising:
   an optical deflector having a polygon mirror reflecting a light flux emitted from a light source to carry out scanning;
   a drive unit rotating the polygon mirror about a rotation axis;
   a board supporting the drive unit and the polygon mirror;
   a housing to which the board is fixed;
   at least two protruding portions protruding from the housing, wherein each of the protruding portions has a hole through which a screw fixing the board to the housing is inserted and a bearing surface which is provided at a position around the hole and which supports the board; and
   first and second abutment portions protruding from the housing,
   wherein each of the first and second abutment portions has a top, which contacts with an undersurface of the board, and supports the board at a position different from the bearing surfaces, and
   wherein a distal end of each of the first and second abutment portions protrudes toward the board higher than the bearing surfaces in a direction along the rotation axis.

2. The optical scanning apparatus according to claim 1, wherein an area of a portion of the board with which each of the abutment portions is contacted is smaller than an area of a portion of the board with which each of the bearing surfaces is contacted.

3. The optical scanning apparatus according to claim 2, wherein the abutment portions are substantially brought into point contact with the board.

4. The optical scanning apparatus according to claim 1, further comprising a fitting hole provided in the housing, with which the drive unit is fitted;
   wherein the fitting hole is arranged on a line segment connecting the holes.

5. The optical scanning apparatus according to claim 4, wherein the abutment portions are arranged at opposite positions with respective to the line segment each other.

6. The optical scanning apparatus according to claim 1, wherein each of the abutment portions is tapered so that a sectional area orthogonal to the rotation axis is gradually reduced toward a distal end of each of the abutment portions.

7. The image forming apparatus according to claim 1, wherein the board rides on the first and second abutment portions without being affixed thereto.

8. An image forming apparatus, comprising:
   a photosensitive member;
   an optical scanning device irradiating and scanning the photosensitive member with light;
   a developing device forming a toner image by causing toner to adhere onto the photosensitive member that is irradiated with the light by the optical scanning apparatus;
   a transfer device transferring the toner image, which is formed by the developing device, onto a recording material;
   wherein the optical scanning device comprising:
   an optical deflector having a polygon mirror reflecting a light flux emitted from a light source to carry out scanning;
   a drive unit rotating the polygon mirror about a rotation axis;
   a board supporting the drive unit and the polygon mirror;
   a housing to which the board is fixed;
   at least two protruding portions protruding from the housing, wherein each of the protruding portions has a hole through which a screw fixing the board to the housing is inserted and a bearing surface which is provided at a position around the hole and which supports the board; and
   first and second abutment portions protruding from the housing,
   wherein each of the first and second abutment portions has a top, which contacts with an undersurface of the board, and supports the board at a position different from the bearing surfaces, and
   wherein a distal end of each of the first and second abutment portions protrudes toward the board higher than the bearing surfaces in a direction along the rotation axis.

9. The image forming apparatus according to claim 8, wherein an area of a portion of the board with which each of the abutment portions is contacted is smaller than an area of a portion of the board with which each of the bearing surfaces is contacted.

10. The image forming apparatus according to claim 9, wherein the abutment portions are substantially brought into point contact with the board.

11. The image forming apparatus according to claim 8, further comprising a fitting hole provided in the housing, with which the drive unit is fitted;
   wherein the fitting hole is arranged on a line segment connecting the holes.

12. The optical scanning apparatus according to claim 8, wherein the abutment portions are arranged at opposite positions with respective to the line segment each other.

13. The image forming apparatus according to claim 8, wherein each of the abutment portions is tapered so that a sectional area orthogonal to the rotation axis is gradually reduced toward a distal end of each of the abutment portions.

14. The image forming apparatus according to claim 8, wherein the board rides on the first and second abutment portions without being affixed thereto.

15. An optical scanning apparatus, comprising:
   an optical deflector having a polygon mirror reflecting a light flux emitted from a light source to carry out scanning;
   a drive unit rotating the polygon mirror about a rotation axis;
   a board supporting the drive unit and the polygon mirror;
   a housing to which the board is fixed;
   at least two protruding portions protruding from the housing, wherein each of the protruding portions has a hole through which a screw fixing the board to the housing is inserted and a bearing surface which is provided at a position around the hole and which supports the board; and
   first and second abutment portions protruding from the housing,
   wherein each of the abutment portions contacts with and supports the board at a position different from the bearing surface, and
   wherein each of the abutment portions is tapered so that a sectional area orthogonal to the rotation axis is gradually reduced toward a distal end of each of the abutment portions.

16. An image forming apparatus, comprising:
   a photosensitive member;
   an optical scanning device irradiating and scanning the photosensitive member with light;
   a developing device forming a toner image by causing toner to adhere onto the photosensitive member that is irradiated with the light by the optical scanning apparatus;
   a transfer device transferring the toner image, which is formed by the developing device, onto a recording material;
   wherein the optical scanning device comprising:
   an optical deflector having a polygon mirror reflecting a light flux emitted from a light source to carry out scanning;
   a drive unit rotating the polygon mirror about a rotation axis;
   a board supporting the drive unit and the polygon mirror;
   a housing to which the board is fixed;
   at least two protruding portions protruding from the housing, wherein each of the protruding portions has a hole through which a screw fixing the board to the housing is inserted and a bearing surface which is provided at a position around the hole and which supports the board; and
   first and second abutment portions protruding from the housing,
   wherein each of the abutment portions contacts with and supports the board at a position different from the bearing surface, and
   wherein each of the abutment portions is tapered so that a sectional area orthogonal to the rotation axis is gradually reduced toward a distal end of each of the abutment portions.

* * * * *